United States Patent [19]

Udono

[11] Patent Number: 4,467,700
[45] Date of Patent: Aug. 28, 1984

[54] HYDRAULIC BOOST MECHANISM
[75] Inventor: Jun Udono, Higashiyamato, Japan
[73] Assignee: Nissan Motor Company, Limited, Yokohama, Japan
[21] Appl. No.: 316,139
[22] Filed: Oct. 29, 1981

Related U.S. Application Data

[62] Division of Ser. No. 109,483, Jan. 4, 1980.

[30] Foreign Application Priority Data

Jan. 17, 1979 [JP] Japan .................................. 54-4098

[51] Int. Cl.³ .............................................. F15B 9/10
[52] U.S. Cl. ...................................... 91/378; 91/372; 91/434; 60/547.3
[58] Field of Search ................ 91/378, 373, 372, 371, 91/370, 434; 60/547 B

[56] References Cited

U.S. PATENT DOCUMENTS

| | | | |
|---|---|---|---|
| 3,033,515 | 5/1962 | Brisbone | 251/175 |
| 3,053,052 | 9/1962 | Garrison et al. | 91/378 |
| 3,119,235 | 1/1964 | Lewis et al. | 91/434 |
| 3,132,567 | 5/1964 | Ingres et al. | 91/369 A |
| 3,133,473 | 5/1964 | Garrison et al. | 91/372 |
| 3,188,796 | 1/1965 | French et al. | 91/391 A |
| 3,526,089 | 9/1970 | Fulmer | 91/434 |
| 3,532,027 | 10/1970 | MacDuff et al. | 91/378 |
| 3,556,153 | 1/1971 | Barbute | 137/625.47 |
| 3,628,423 | 12/1971 | Dymond | 91/376 R |
| 3,691,903 | 9/1972 | Shellhause | 91/372 |
| 3,712,177 | 1/1973 | Bach et al. | 91/369 A |
| 3,747,473 | 7/1973 | Boch et al. | 91/373 |
| 3,782,781 | 1/1974 | Lewis | 60/547.3 |
| 3,811,472 | 5/1974 | LeMarchand | 137/625.68 |
| 3,845,693 | 11/1974 | Meyers | 91/378 |
| 3,914,941 | 10/1975 | Gardner | 60/553 |
| 3,926,092 | 12/1975 | Meyers | 91/378 |
| 3,951,043 | 4/1976 | Keady | 91/372 |
| 4,117,769 | 10/1978 | Carre et al. | 91/369 A |
| 4,173,234 | 11/1979 | Thomas et al. | 137/625.47 |

FOREIGN PATENT DOCUMENTS

| | | |
|---|---|---|
| 2001680 | 7/1970 | Fed. Rep. of Germany . |
| 1917954 | 10/1970 | Fed. Rep. of Germany . |
| 2048922 | 5/1971 | Fed. Rep. of Germany . |
| 2012472 | 10/1971 | Fed. Rep. of Germany . |
| 2602050 | 8/1977 | Fed. Rep. of Germany . |
| 2834510 | 7/1979 | Fed. Rep. of Germany . |
| 1305613 | 8/1962 | France . |
| 1381833 | 11/1964 | France . |
| 2078014 | 11/1971 | France . |
| 2086204 | 12/1971 | France . |
| 2164880 | 8/1973 | France . |
| 2226305 | 11/1974 | France . |
| 2237787 | 2/1975 | France . |
| 2275667 | 1/1976 | France . |
| 54-99875 | 8/1979 | Japan . |
| 556725 | 10/1943 | United Kingdom . |
| 580283 | 9/1946 | United Kingdom . |
| 1254081 | 11/1971 | United Kingdom . |
| 1283885 | 8/1972 | United Kingdom . |
| 1346187 | 2/1974 | United Kingdom . |
| 2003564 | 3/1979 | United Kingdom . |
| 2044377 | 10/1980 | United Kingdom . |

Primary Examiner—Paul E. Maslousky
Attorney, Agent, or Firm—Schwartz, Jeffery, Schwaab, Mack, Blumenthal & Koch

[57] ABSTRACT

A hydraulic power booster in a hydraulic brake system for an automatic vehicle includes a booster housing having inlet and outlet ports respectively connected to a fluid reservoir. A piston is slidably received within the booster housing and is connected with a master cylinder of the brake system. The piston is operated by the motion of a spool valve slidably disposed within the piston responsive to depression and release of the brake pedal. The spool valve is operated by a plunger interpositioned between the spool valve and the brake pedal. The plunger slidably extends through an outer cylindrical member which is received within the booster housing. The outer cylindrical member is cooperatively connected with the piston so that it can move in accordance with the movement of the piston. The plunger and outer cylindrical member are exchangeable to vary the ratio of the reaction force with respect to the boost force built up in the booster.

13 Claims, 4 Drawing Figures

HYDRAULIC BOOST MECHANISM

This is a division, of application Ser. No. 109,483, filed Jan. 4, 1980.

BACKGROUND OF THE INVENTION

1. Field of the Invention

The present invention relates to a hydraulic power boost mechanism for an automotive vehicle such as a truck, forklift truck or passenger car. More particularly, the present invention relates to an improvement for increasing the boosting pressure of the boost mechanism for a braking system of an automotive vehicle.

2. Description of the Prior Art

As is well-known to those skilled in the art, a hydraulic boost mechanism, which will be hereinafter referred to as a power booster or hydraulic power booster, is provided between a foot pedal and a split system master cylinder for application of boost force to a braking system of an automotive vehicle when the foot pedal is moved into the braking position. Such a hydraulic power booster has been provided in the braking system and has been coupled with a steering gear system for sharing hydraulic power therewith.

Generally the hydraulic power booster has a housing in which a piston reciprocates; the piston divides the housing into an exhaust chamber and a pressure chamber. The piston is provided with a longitudinal bore which receives a control valve means including a spool valve means which can be moved to a released position communicating the pressure chamber to the exhaust chamber and also communicating an inlet port to an outlet port which is connected to a steering gear device, and to an applied position connecting the pressure chamber to a hydraulic fluid pressure source for developing a boost pressure in the pressure chamber and thus for driving the piston. The booster further has a means for co-operating the foot pedal with the piston in order to move the spool valve means of the piston into the applied position when the foot pedal is moved to the braking position. Then, the spool valve means narrows and finally closes the channel communicating the inlet port to the outlet port and also narrows the channel communicating the pressure chamber to the exhaust chamber. In turn, the spool valve means opens the channel communicating the inlet port to the pressure chamber. Thereby, hydraulic fluid flowing into the booster is applied to the pressure chamber to develop the boost pressure for driving the piston for application of the master cylinder so as to decelerate the vehicle and thus for applying a hydraulic reaction for stiffening the pedal.

In a conventional booster, since the thrust plunger as the means for co-operating the foot pedal with the powering piston has been integrally formed, the ratio of hydraulic boost force applied to the piston for driving the same and hydraulic reaction for the foot pedal is fixedly determined as a function of the ratio of the diameters of the plunger and the piston. When a need to change the ratio arises, it is necessary to change the diameter of the plunger relative to that of the piston. It will be noted that, to render it fluid proof the plunger is received slidably but has a minimum clearance with the housing. Therefore, to change the diameter of the plunger may involve changing the diameter of the bore and thereby changing the housing. In practice, for varying the ratio of boost force and hydraulic reaction, it has been required to use a plurality of power boosters having various ratios of the boost force and hydraulic reaction. This causes complications of construction of a hydraulic braking system as well as produces a high cost for the system.

Further, it is desired that the ratio of hydraulic pressure applied to the piston for driving the same relative to the hydraulic reaction acting on the foot pedal should as great as possible. The above mentioned ratio is calculated by the following formula:

$$R = A_2/A_3$$

where:

R is the ratio of boost force to hydraulic reaction;

$A_2$ is a cross-sectional area of the power piston, at a portion where the boost pressure is applied;

$A_3$ is a cross-sectional area of the head of a thrust plunger as a connecting means for connecting the piston to the foot pedal.

It will be obvious that increasing the ratio of boost force can be accomplished by making $A_3$ smaller or making $A_2$ larger. However, since the head of the thrust plunger is subject both to the force moving the foot pedal into the braking position and the hydraulic reaction due to the boost pressure, it is in practice difficult to decrease the sectional area thereof. Thereby, it has been required for increasing the ratio of boost force to increase the sectional area of the piston. Increasing the sectional area of the piston may cause various problems, such as:

(a) increasing the sectional area of the piston naturally requires increasing the sectional area of the bore formed in the booster housing resulting in an increase in the volume of pressure fluid needed for applying the booster;

(b) increasing the fluid volume may cause an increased loss of energy;

(c) since such a booster can apply greater pressure with smaller operating power, when relief pressure is applied to the steering system, too much pressure may possibly be applied to satisfactorily match the combination of steering system and the boost system.

Therefore, in practice, the conventional booster has been limited to a pressure ratio on the order of 6:1.

SUMMARY OF THE INVENTION

Therefore, it is an object of the present invention to provide a hydraulic power booster capable of varying the ratio of boost pressure relative to hydraulic reaction and of making the ratio greater than that of a conventional boost system.

It is a more specific object of the present invention to provide a hydraulic power booster having a thinner thrust plunger compared with that of a conventional one so that it may allow an increase in the ratio of boost force with respect to hydraulic reaction.

Another object of the present invention is to provide a hydraulic power booster having a means for protecting the thrust plunger which is formed thinner than that a conventional one, from operating power applied through the foot pedal and hydraulic reaction.

A further object of the present invention is to provide a hydraulic power booster capable of varying the boost pressure, in which the ratio to the hydraulic reaction is at maximum approximately 20:1.

A hydraulic power booster in a hydraulic brake system for an automotive vehicle includes a booster housing having inlet and outlet ports respectively connected to a fluid reservoir. A piston is slidably received within the booster housing and is connected with a master cylinder of the brake system. The piston is operated by the motion of a spool valve slidably disposed within the piston responsive to depression and release of the brake pedal. The spool valve is operated by a plunger interpositioned between the spool valve and the brake pedal. The plunger slidably extends through an outer cylindrical member which is received within the booster housing. The outer cylindrical member is cooperatively connected with the movement of the piston. The plunger and outer cylindrical member are exchangeable to vary the ratio of the reaction force with respect to the boost force built up in the booster.

BRIEF DESCRIPTION OF THE DRAWINGS

The present invention will become more fully understood from the detailed description given below, and the accompanying description of the preferred embodiment of the present invention, which, however, are not to be taken as limitative of the present invention in any way, but are for the purpose of elucidation and explanation only. In the drawings.

DESCRIPTION OF THE PREFERRED EMBODIMENT

Figure 1:
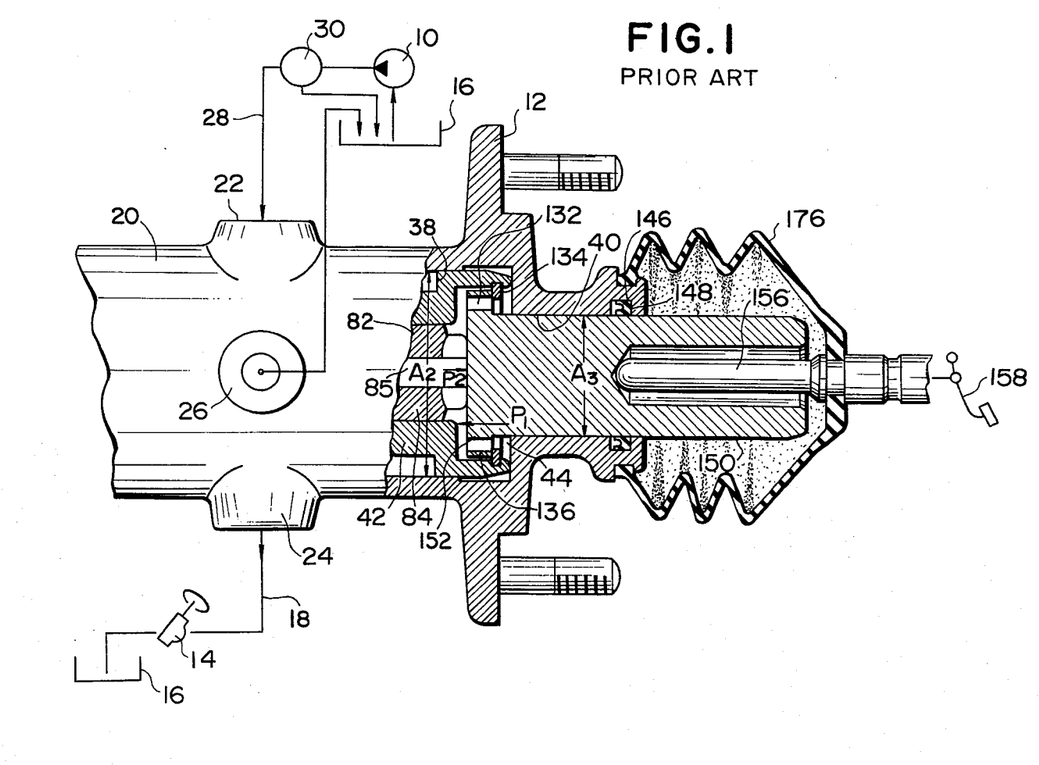
FIG. 1 is a partial side elevational view of a conventional hydraulic power booster, in which a portion relating to the present invention is shown in section for explanation.

Before illustration of the preferred embodiment of the present invention, there is schematically illustrated a general construction of a conventional power booster for better understanding of the invention. FIG. 1 shows a conventional hydraulic brake power booster 12 with a hydraulic system including a steering gear mechanism 14. The power booster 12 has a housing 20 which is provided with an inlet port 22, an outlet port 24 and an exhaust port 26. The inlet port 22 communicates with a pump 10 via pipe line 28 with a fluid control valve 30. The outlet port 24 communicates with the steering gear mechanism 14 which is connected to a fluid reservoir 16 via a return line 18.

The housing 20 is provided with a bore 38 which slidably receives a power piston 42 defining a pressure chamber 44. The piston 42 is also formed with a bore 82 which slidably receives a spool valve 84. The spool valve 84 has an end which is provided with a passage 85 for communicating the inlet port 22 to the pressure chamber 44. A thrust plunger 150 with a disk-shaped head 152 is slidably inserted within the bore 40 of the housing 20 so that the head 152 faces the end of the spool valve 84. The plunger 150 is connected to a foot pedal 158 via thrust rod 156 at one end and also contacts the piston 42 by engagement of a connecting ring 134 with head 152 so as to co-operate therewith.

In FIG. 1, reference numerals 146 and 176 respectively denote an annular sealing member for fluid proofing and a dust boot for protecting the booster.

When the foot pedal 158 is in the released position, the spool valve 84 establishes direct communication between the inlet port 22 and the outlet port 24. Therefore, the hydraulic fluid flows into inlet port 22 and flows out from outlet port 24. At this time, the pressure chamber 44 communicates with the exhaust port 26 through an exhaust chamber and thereby boost pressure is not built up. When the foot pedal is moved from the released position to the left in FIG. 1, the spool valve 84 gradually blocks direct communication between the inlet port 22 and the outlet port 24 and establishes communication between the inlet port 22 and the pressure chamber 44. Thereby, hydraulic fluid flows into the pressure chamber 44 to build up boost pressure to move the piston to the left in the drawing for operating a split system master cylinder.

At this time, the ratio of the boost force applied to the piston 42, which force is indicated by arrow P1, relative to the hydraulic reaction, indicated by arrow P2, can be represented by the formula, $R = A_2/A_3$.

Figure 2:
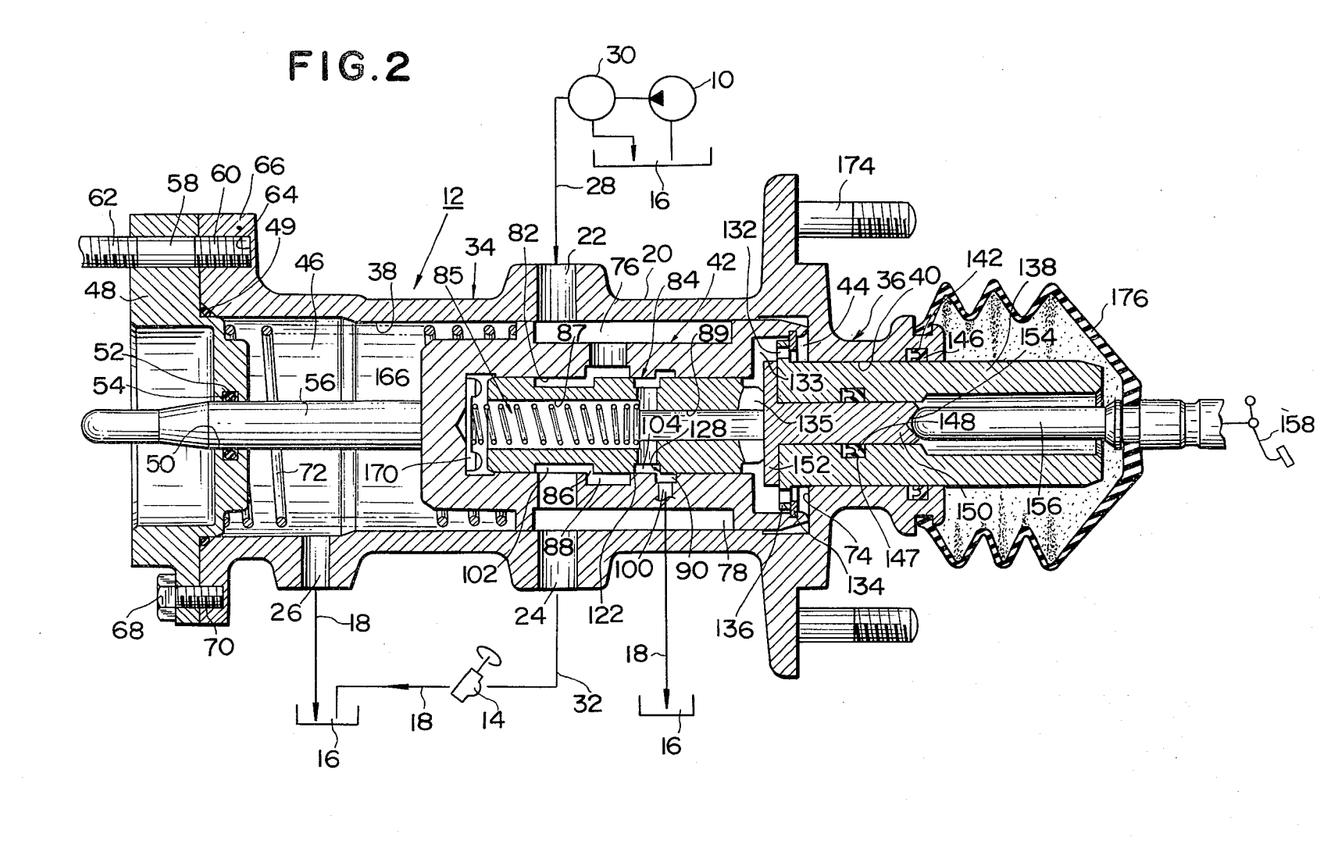
FIG. 2 is a vertical-section of a hydraulic power booster according to the preferred embodiment of the present invention with a hydraulic system schematically illustrated.
Figure 3:
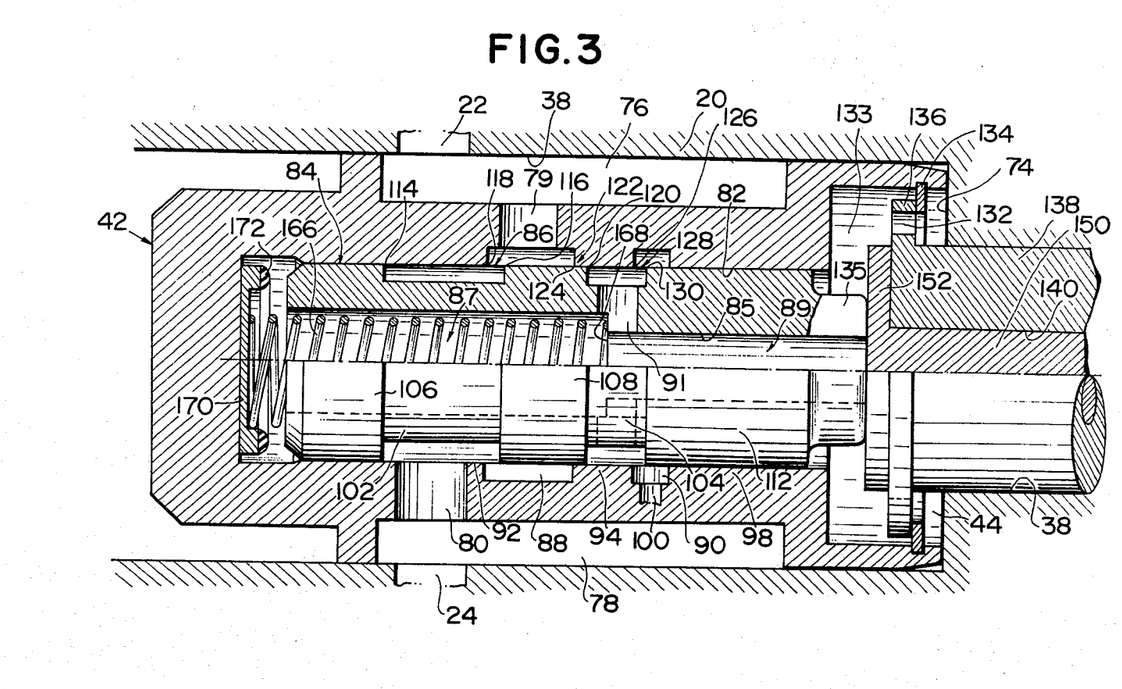
FIG. 3 is an enlarged partial vertical-section of the power booster of FIG. 2, sectioned above the longitudinal axis and showing the released position.
Figure 4:
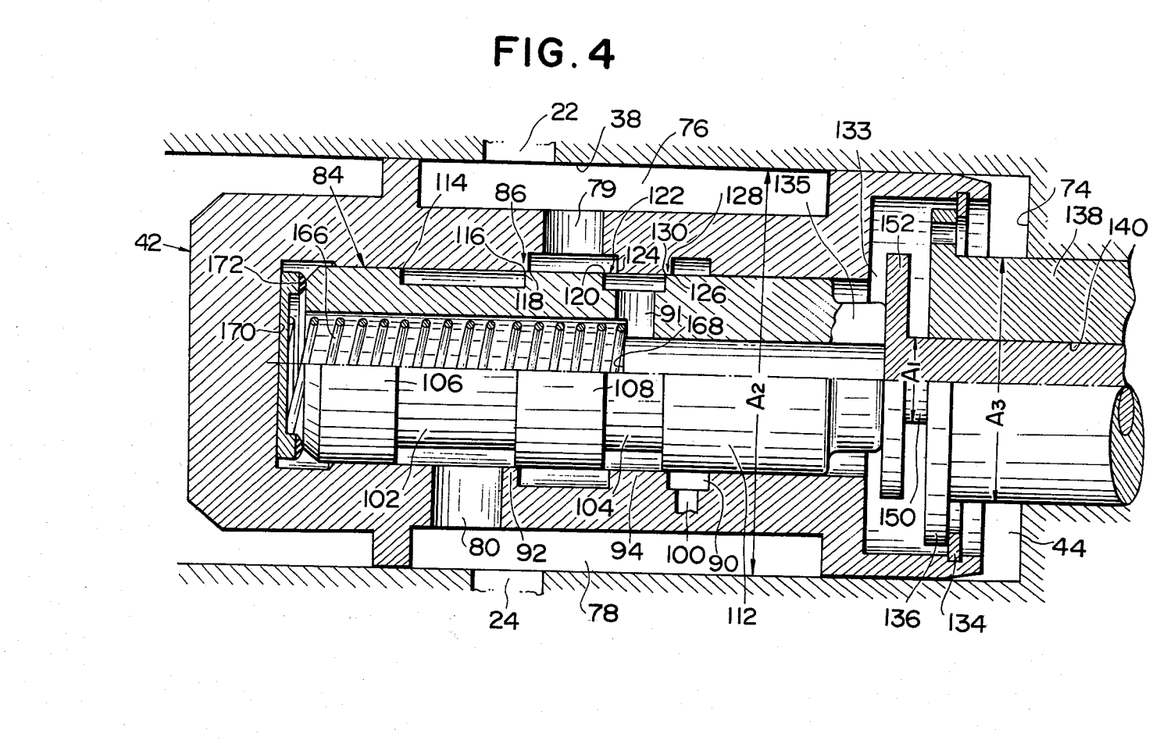
FIG. 4 is a partial section of the boost mechanism similar to FIG. 3 but showing the applied position.

Now, referring to FIGS. 2 to 4, for purpose of illustration only, and not by way of limitation, there is illustrated a preferred embodiment of a hydraulic power boost mechanism in accordance with the present invention. For simplification of the explanation and for making the principles of the present invention clear, features and elements substantially the same in construction or in function to those in the above conventional booster will be denoted by the same reference numerals. The power booster 12 is connected to a hydraulic fluid pump 10 which supplies hydraulic fluid thereto, and to a steering gear mechanism 14 connected in series flow relationship to the return side of the hydraulic circuit for returning the fluid to a fluid reservoir 16 via line 18. The power booster 12 includes a generally cylindrical-shaped housing 20 provided with an inlet port 22, an outlet port 24 and an exhaust port 26. The inlet port 22 communicates with the outlet port of the pump 10 through pipe line 28 with a fluid control valve 30. The outlet port 24 is connected to the inlet side of the steering mechanism 14 through pipe line 32. The exhaust port 26 is communicated to the return line 18 which also carries hydraulic fluid from the steering mechanism 14 to the inlet of the pump 10 or a fluid reservoir 16 connected with the pump 10, to complete the hydraulic circuit.

The housing 20 of the power boost mechanism 12 generally comprises two portions 34 and 36 having different diameters. The portions 34 and 36 are formed with bores 38 and 40, respectively, of which the diameters are different from each other and which are joined end to end. The bore 38 has a diameter larger than that of the bore 40. The bore 38 slidably receives a generally cylindrical-shaped power piston 42 having a diameter substantially the same as the internal diameter of the bore 38 so as to divide the bore 38 into a pressure chamber 44 and an exhaust chamber 46. A plug or fitting 48 with an annular sealing member 49 sealingly closes the end of the bore 38 adjacent the exhaust chamber 46. The plug or fitting 48 is provided with a central opening 50. The opening 50 is provided with an internal annular groove 52 which receives an annular sealing member 54 through which a force transmitting rod 56 slidingly projects to connect the piston 42 to a split system master cylinder (not shown) to apply front and rear brakes, respectively. Although the master cylinder is not shown in the drawing, it will be appreciated that the power booster 12 is secured to the master cylinder by means of a plurality of connecting rods 58 having threaded portions 60 and 62 at both ends. The portion 60 engages with a threaded blind recess 64 formed in the flange portion 66 of the housing 20 to secure the fitting onto the housing 20. A plurality of bolts 68 are also engaged with the threaded recess 64 of the housing 20 and a threaded opening 70 of the fitting 48 in order to secure the fitting to the housing 20.

A piston return spring 72 is disposed in the exhaust chamber 46 of the bore 38, one end of which abuts the inner surface of the fitting 48 and the other end of which abuts the piston 42. Thereby, the spring 72 urges the piston 42 toward the pressure chamber 44 so that, in the brake released or power-off position, the piston 42 is in abutment with radial portion 74 of the housing 20 between the portions 38 and 40. The piston 42 is formed with external channels 76 and 78 each extending longitudinally along the longitudinal axis of the piston 42, in its outer surface. The channel 76 is located opposing the inlet port 22 so as to communicate therewith. The channel 78 is located opposing the outlet port 24 so as to communicate therewith. The channels 76 and 78 are of substantially the same length and of sufficient length for maintaining communication between the inlet port 22 and the outlet port 24 in all the piston positions. In the preferred embodiment, the inlet port 22 and the outlet port 24 are provided substantially symmetrically with respect to longitudinal axis of the housing 20, and thus the channels 76 and 78 are provided on the outer surface of the piston 42 substantially symmetrically with respect to the longitudinal axis of the piston 42, but they may be located otherwise. For example, they can be located asymmetrically. It should be appreciated the channels 76 and 78 are not necessarily of the same length, but it is merely required that the channels 76 and 78 oppose the inlet port 22 and outlet port 24 for communication of the inlet port 22 to the outlet port 24 or pressure chamber 44. As shown in FIGS. 3 and 4, the piston 42 is formed with annular recesses 88 and 90 respectively located between lands 92, 94 and 94, 98 on the internal surface thereof in parallel relationship with respect to one another. Each of the recesses 88 and 90 is opened toward an internal longitudinal bore 82 formed with the piston 42. The piston 42 is provided with radial passages 79 and 80 each having ends opening toward both the external and internal surface thereof. The radial passage 79 is located to connect the recess 88 with the channel 76. The passage 80 is located to connect the channel 78 to the interior of the piston 42. The bore 82 of the piston 42 houses spool valve 84 in slidable position for controlling the boost pressure built up in the power chamber 44. The piston 42 is further formed with a radial passage 100 having ends communicating with the recess 90 and with the exhaust chamber 46 or with the return line 18. The spool valve 84 is provided with annular grooves 102 and 104 respectively defined by lands 106, 108 and 108, 112 on the external surface thereof. The spool valve 84 is further provided with a stepped bore 85 communicating with the recess 104 through a passage 91 and acts as a passage connecting the recess 104 to the pressure chamber 44. The bore 85 has two portions 87, 89 having different diameters. The shoulder 114 of land 106 opposes the shoulder 116 of the land 108 so as to define therebetween the groove 102. The shoulder 116 serves to establish and block communication between the recesses 88 and 102. For this purpose, shoulder 116 acts with shoulder 118 of the land 92. In the released position of the spool valve 84, as shown in FIG. 3, the recess 102 is positioned in communication with the recess 88 to establish communication between the inlet port 22 and the outlet port 24.

The shoulder 120 of the land 108 adjacent the exhaust chamber 46 acts to establish and block communication between recesses 88 and 104 together with the shoulder 124 of the land 94 adjacent the pressure chamber 44. When the recesses 88 and 104 are in communication, the fluid introduced through the inlet port flows into the pressure chamber 44 via the recess 104. The shoulder 126 of the land 112 adjacent the exhaust chamber 46 acts to establish and block communication between the recesses 104 and 90 together with the shoulder 130 of the land 98. Through recess 90, recess 104 communicates with the exhaust chamber 46 and the fluid reservoir 16 via the passage 100 formed in the piston 42 and the return line 18. In the released position of the spool valve 84, the recess 104 is in the position where the shoulder 126 does not overlap the shoulder 130 so as to communicate pressure chamber 44 with the exhaust chamber 46 and fluid reservoir 16 through the passage 100. In this position, the shoulders 120 and 124 block communication between recesses 88 and 104 and thus the fluid from the pump 10 is not supplied to the pressure chamber 44.

The power piston 42 is fixedly provided with an annular connecting ring 134 at the internal surface of the end adjacent the pressure chamber 44. The ring 134 engages with a flange portion 136 of an outer cylindrical member 138 slidably received in the stepped bore 40 of the housing 20. The cylindrical member 138 is provided with a bore 140. The flange portion 136 of the member 138 is provided with a plurality of orifices 132 in order to establish communication between a passage 133, communicating with the passage 85 through the opening 135, and the pressure chamber 44. A helical spring 166 is disposed within the portion 87 of the bore 85 of the valve means 84, one end of which abuts the step 168 between the portions 87 and 89 of the bore 85, and the other end of which is seated on a spring seat 170 mounted at the bottom of the bore 82 of the piston 42. The spring 166 normally urges the piston 42 together with the plunger member 150 toward head 152. The spring seat 170 is provided with an annular projective portion 172 on a surface opposing the piston 42. The piston abuts the portion 172 so as not to move beyond a predetermined range, when the control valve is in the applied position.

As shown in FIG. 2, on the inner surface of the bore 40 at the portion 36 of the housing 20, there is formed an annular recess 142 which receives therein an annular sealing member 146. The inner surface of the sealing member 146 contacts the outer surface of the member 138 for fluid sealing purposes. The cylindrical member 138 is provided with an internal annular recess 147 on the inner surface thereof. An annular sealing member 148 is received within the recess 147. A plunger member 150 with a disk-shaped head 152 is slidably disposed within the bore 140 of the cylindrical member 138 in a fluid sealed position with the outer surface thereof in engagement with the sealing member 148. The head member 152 is positioned within the bore 38 of the housing 20 in abutment with the end of the spool valve 84. The head member 152 is provided with a generally cone-shaped recess 154 at the end opposing the thrust rod 156 so as to receive the round top of the rod 156.

Thereby, the rod 156 is allowed to rotate with respect to the recess 154. A foot pedal 158 is pivotally carried on the exterior end of the thrust rod 156.

In the drawings, reference numeral 174 denotes a bolt for installing the booster 14 onto the vehicle body, and 176 denotes a dust boot for preventing dust and dirt from entering the booster.

Assuming the pump 10 is in operation and the brake pedal 158 is released, the relationship between the power piston 42, and spool valve 84 is as illustrated in FIGS. 2 and 3. At this time, hydraulic fluid flows through inlet Port 22, channel 76, radial passage 79, recesses 88 and 102, radial passage 80, channel 78 and outlet port 24, and then the fluid returns to the pump 10 via the steering gear mechanism 14 without building up the boost pressure in the booster. In this released position, the pressure chamber 44 communicates with the exhaust port 26 through orifices 132, passage 133, opening 135, passages 85 and 91, recesses 104 and 90, radial passage 100, and exhauust chamber 46. Moving the pedal 158 from the released position, as shown in FIG. 4, moves the spool valve 84 to the left. The shoulder 116 approaches the shoulder 118 to narrow the gap therebetween to reduce the amount of fluid flowing therethrough. At the same time, the shoulder 130 approaches shoulder 126 to gradually narrow the gap therebetween to reduce the amount of fluid flowing therethrough. When the land 112 overlaps land 94, groove 104 communicates with the recess 88 to establish communication between the pressure chamber 44 and the inlet port 22 through the orifice 132, passage 85 of spool valve 84, and various passages including annular recess 104. As the foot pedal or brake pedal 158 is further depressed the gap between shoulders 124 and 120 becomes wider to admit an increased amount of fluid to the pressure chamber 44 to build up the boost pressure in the chamber 44 until finally the boost force attains a predetermined value the net force of which overcomes the spring 72, disposed within the exhaust chamber 46 urging the piston 42 toward the pressure chamber 44 so as to cause the piston 42 to shift as shown in FIG. 4. The outer cylindrical member 138 connected with the piston 42 by means of engagement between the connecting ring 134 and the flange portion 136 is thereby moved according to the position of the piston 42.

According to the present embodiment, when the foot pedal 158 is moved from the released position to the left, as shown in FIG. 4, at first, the thrust rod 156 pushes the thrust plunger 152 toward the spool valve 84 to move the same against the force of spring 166 toward the exhaust chamber 46. Then, the gap between shoulders 118 and 116 is gradually narrowed and shoulder 120 moves across shoulder 124 to open the gap therebetween to distribute the fluid to both the steering gear mechanism 14 and the pressure chamber 44. Thereby, the boost pressure can be built up within the pressure chamber 44. When the boost force overcomes the force of return spring 72 urging the piston toward the pressure chamber, the piston 42 is moved toward the exhaust chamber 46 together with the power transmitting rod 56. Then, the outer cylindrical member 138 connected to the piston 42 by the connecting ring 134 is pulled according to movment of the piston and protrudes into the portion 38, as shwon in FIG. 4. Then, if the foot pedal 156 is further moved to the left, the thrust plunger 150 is moved further to the left together with the piston 42 and the member 138 and finally abuts the seat 170. Then, the disk-shaped head 152 protrudes from the outer cylindrical member 138 by a distance. This distance between the head 152 and flange portion 136 of the outer cylindrical member 138 will be preserved during the application of boost pressure for the braking system. At this time, the gap between shoulders 116 and 118 is completely closed and the gap between shoulders 120 and 124 is completely opened to supply all of the hydraulic fluid from the pump 10 to the pressure chamber 44. Accordingly, a maximum boost pressure is built up and is applied to the master cylinder for rapid deceleraton of the vehicle.

When the boost force is applied to the braking system of the vehicle through the master cylinder, the foot pedal becomes stiffer due to hydraulic reaction. Hydraulic reaction is subject to both the head 152 and the outer cylindrical member 138. However, hydraulic reaction applied to the head 152 has an effect on the foot pedal 158 only for the value due to the sectional area $A_1$ thereof to make the pedal stiffer. On the other hand, the power piston is subject to boost force corresponding to the annular sectional area $A_2 - A_3 + A_1$. Thereby, the ratio of boost force relative to the hydraulic reaction is $(A_2 - A_3 + A_1) / A_1$. It will be appreciated that the distance 1 between the plunger head 152 and the flange portion will not exceed the range 2-5mm and thereby, no effect, or at least no considerable effect will be applied to the protruding portion.

According to the present invention, since the hydraulic reaction applied to the foot pedal can be varied by merely changing the relative sectional areas of the plunger 150 and member 138 the ratio of the force can be easily varied without involving a major change of booster construction. In the meanwhile, in accordance with the present invention, since the outer cylindrical member 138 moves with plunger member 150 to protect the same from the hydraulic reaction, the diameter $A_1$ of the plunger member 150 can be thinner than that required in a conventional booster. Therefore, the range for varying the ratio, (boost force)/(hydraulic reaction), can be broader: actually at a maximum approximately 20:1.

Further, since the thrust plunger member and the outer cylindrical member can be applied to the booster without requiring any change of construction of the other segments, it can be applicable to any conventional booster.

Although the present invention has been shown and described in terms of the preferred embodiment, it should not be considered as limited to thereto. It will be understood that variations to any particular embodiment can be made without departing from the scope of the present invention, which is delimited and defined not by any of the details of the shown embodiments, or of the drawings, but solely by the accompanying claims.

What is claimed is:

1. A hydraulic power boost mechanism in a hydraulic brake system for an automotive vehicle, said system including a brake pedal, said mechanism comprising:
   a housing formed with an inlet port, an outlet port and an exhaust port therein, said housing having a housing bore formed therein, said housing bore including first and second sections, said first and second sections having different diameters with respect to each other;
   a power piston slidably disposed within said first section of said housing bore to define a pressure chamber and an exhaust chamber in said first section, said power piston having a longitudinally extending piston bore formed therein;

a control valve disposed within said piston bore and being movable along the longitudinal axis of said piston between an applied position and a released position; and an actuation means for operating said control valve in response to the position of said brake pedal, said actuation means including an inner and outer member, said outer member being slidably received within said second section of said housing bore and engaging said power piston, said inner member having a head abutting said control valve for moving said control valve between said released and applied positions, and said inner member being freely movable with respect to said outer member in response to movement of said brake pedal.

2. A hydraulic power boost mechanism in a hydraulic brake system for an automotive vehicle, comprising:

a housing formed with an inlet port, an outlet port and an exhaust port, said housing defining a housing bore therein, which bore communicates with a fluid source via said inlet port, said housing bore having first and second sections, said first and second sections having different diameters;

a power piston slidably disposed within the first section of said housing bore to divide the first section into a pressure chamber and an exhaust chamber, said exhaust chamber communicating with said exhaust port, said power piston defining therein a longitudinally extending piston bore and being connected with the brake system for operating the latter and for providing a boost force thereto;

a control valve disposed within said piston bore and being movable along the longitudinal axis of said piston bore between an applied position and a released position;

an actuation means for moving said control valve between said released position and said applied position, said actuation means including an inner and an outer member and being coaxially disposed within said second section of the housing bore, said outer member having an inner end cooperatively engaged with said power piston for movement in response to movement of said power piston and said inner member being interpositioned between said control valve and a brake pedal of said brake system for moving said control valve between said released and applied positions, said inner member being slidably disposed in said outer member and having a constant diameter within said outer member.

3. A power boost mechanism, as recited in claim 1 or 2, wherein a means for connecting said outer member with said power piston is provided on an power piston adjacent the end facing said outer member.

4. A power boost mechanism, as recited in claim 3, wherein said outer member has a flange portion on the inner end thereof and said connecting means comprises an annular ring secured on an internal surface of said power piston, said ring engaging the flange portion of the outer member.

5. A power boost mechanism, as recited in claim 1 or 2, wherein a ratio of boost force relative to hydraulic reaction pressure can be changed by changing the outer member and the maximum ratio is about 20:1.

6. A power booster in a hydraulic brake system for an automotive vehicle comprising:

(A) a housing defining a bore therein, said bore having an inlet adapted to be connected to a fluid source and an outlet;

(B) a piston slidably mounted in said bore and cooperating with an end of the latter to define a boost chamber therebetween;

(C) fluid pressure control means for regulating the fluid pressure level within said booster between a lower value when said piston is disposed in a first position and a higher value when the piston is shifted toward a second position, said fluid pressure control means inlcuding means for maintaining a continuous flow to the outlet independently of the position of the piston, said fluid pressure control means comprising:

(i) means defining a vent for said boost chamber;

(ii) control valve means slidably and coaxially arranged in said piston and shiftable between a first location for communicating said boost chamber to the means defining the vent, and a second location for initiating communication between the inlet and the boost chamber;

(iii) and first resilient means acting on the control valve means for urging the latter to said first location and second resilient means acting on said piston urging the latter to said first position; and (D) an actuation means interpositioned between said control valve means and a brake pedal to shift the control valve means between said first and second locations in response to the brake pedal position, said actuation means having a first and a second member, said first member being slidably received within said bore of the housing and cooperating with said piston, said second means being coaxially arranged within said first member and connecting said brake pedal to said control valve means for transmission of a brake force applied to the brake pedal, said first and second members being movable independently of one another and independently of the housing, and said second member having a relatively small cross sectional dimension with respect to the cross sectional dimension of the boost chamber and being interchangeable by replacement of the first and second members with ones having a different cross sectional dimension relationship with respect to one another and with respect to the boost chamber.

7. A power booster in a hydraulic brake system for an automotive vehicle comprising:

(A) a housing defining a bore therewithin having an inlet adapted to be connected to a fluid source and an outlet;

(B) a piston slidably mounted in said bore and cooperating with an end of the latter to define a boost chamber therebetween;

(C) fluid pressure control means carried by said piston and by a wall of the bore for regulating the fluid pressure level within said booster between a lower value when said piston is disposed in a first position and a higher value when the piston is shifted toward a second position, said fluid pressure control means including means for maintaining a continuous flow to the outlet independently of the position of the piston, said fluid pressure control means comprising:

(i) radially spaced opening on said piston and said bore, respectively;

(ii) means for defining a vent for said boost chamber;

(iii) control valve means slidably and coaxially arranged in said piston and shiftable from a first location communicating said boost chamber to the means defining the vent, and a second location initiating communication between the inlet and the boost chamber;

(iv) first resilient means acting on the control valve means to urge the latter to said first location; and (v) second resilient means acting on said piston urging the latter to said first position; and (D) an actuation means interpositioned between control valve means and a brake pedal, said actuation means having an outer cylindrical first member and an inner second member, said first member having an opening therein, said first member having an inner end engaging said piston for movement in response to movement of said piston and said second member having an inner end facing an end of said control valve means and having a transverse sectional dimension corresponding to the transverse sectional dimension of said opening in said first member, said second member being slidably disposed in said opening in said first member and being freely movable with respect to said first member in response to brake pedal movement.

8. A power booster for use in a hydraulic brake system, comprising:

a housing having a housing bore formed therein, said housing having an inlet communicating with said bore and an outlet communicating with said bore;

a piston slidably received in said housing bore for movement between a first position in said housing bore and a second position in said housing bore, said piston having a piston bore formed therein;

a control valve slidably mounted in said piston bore for movement between a released position and an applied position; and actuation means mounted in said housing bore for causing movement of said control valve and controlling an amount of reaction force created by said power booster, said actuation means including an outer member slidably received in said housing bore, said outer member engaging said piston for being drawn along said housing bore by said piston in response to said piston moving from said first position toward said second position; and an inner member having a portion slidably received in said outer member said inner member having a first end engaging said control valve and a second end for operative engagement with a brake pedal, said inner member portion having a constant diameter to be freely moved within said outer member in response to movement of said pedal.

9. A hydraulic power boost mechanism in a hydraulic brake system for an automotive vehicle, comprising:

a brake pedal;

a housing defining therein a housing bore having first and second sections and connected with a fluid source, said first section having a larger diameter than that of said second section;

a power piston slidably disposed within said first section of said housing bore to define a pressure chamber, said power piston having a longitudinally extending bore formed therein;

a control valve disposed within said piston bore and being movable along the longitudinal axis of said piston between an applied position and a released position; and an actuation means for moving said control valve between said released position and said applied position, said actuation means including an inner and an outer member and being coaxially disposed within said second section of the housing bore, said outer member having an inner end cooperatively engaged with said power piston for movement in response to movement of said power piston and said inner member having a portion received within said outer member, said portion having a constant diameter throughout, said actuation means interpositioned between said control valve and said brake pedal of said brake system for moving said control valve between said released and applied positions.

10. A hydraulic power boost mechanism in a hydraulic brake system for an automotive vehicle, comprising:

a brake pedal;

a housing defining therein a housing bore having first and second sections and connected with a fluid source, said first section having larger diameter than that of said second section;

a power piston slidably disposed within said first section of said housing bore to define a pressure chamber, said power piston having a longitudinally extending bore formed therein;

a control valve disposed within said piston bore and being movable along the longitudinal axis of said piston between an applied position and a released position; and an actuation means for operating said control valve in response to the position of said brake pedal, said actuation means including an inner and an outer member, said outer member being slidably received within said second section of said housing bore and engaging said power piston for movement with said power piston, said inner member having a head abutting said control valve for moving said control valve between said released and applied positions, and said inner member being coaxially disposed in said outer member and having a constant diameter substantially throughout so that it is freely movable with respect to said outer member in response to movement of said brake pedal.

11. A hydraulic power boost mechanism in a hydraulic brake system for an automotive vehicle, comprising:

a brake pedal;

a housing defining therein a housing bore having first and second section and connected with a fluid source, said first section having larger diameter than that of said second section;

a power piston slidably disposed within said first section of said housing bore to define a pressure chamber, said power piston having a longitudinally extending bore formed therein;

a control valve disposed within said piston bore and being movable along the longitudinal aixs of said piston between an applied position and a released position; and an actuation means interpositioned between said control valve means and a brake pedal to shift the control valve means between said first and second locations in response to the brade pedal position, said actuation means having a first and a second member, said first member being slidably received within said bore of the housing and cooperating with said piston, said, second member being coaxially arranged within said first member and connecting said brake pedal to said control valve means for transmission of a brake force applied to the brake pedal, said first and second members being movable independently of one another and independently of the housing, and said second member having a relatively small cross sectional dimension with respect to the cross sectional dimension of the boost chamber and being interchangeable by replacement of the first and second members with ones having a different cross sectional dimension relationship with respect to one another and with respect to the boost chamber.

12. A hydraulic power boost mechanism in a hydraulic brake system for an automotive vehicle, comprising:
   a brake pedal;
   a housing defining therein a housing bore having first and second sections and connected with a fluid source, said first section having larger diameter than that of said second section;
   a power piston slidably disposed within said first section of said housing bore to define a pressure chamber, said power piston having a longitudinally extending bore formed therein;
   a control valve disposed within said piston bore and being movable along the longitudinal axis of said piston between an applied position and release position; and
   an actuation means interpositioned between said control valve means and a brake pedal, said actuation means having an outer cylindrical first member and an inner second member, said first member having an opening therein, said first member having an inner end engaging said piston for movement in response to movement of said piston and said second member having an inner end facing an end of said control valve means and having a transverse sectional dimension corresponding to the transverse sectional dimension of said opening in said first member, said second member being slidalby disposed in said opening in said first member and being freely movable with respect to said first member in response to brake pedal movement.

13. A hydraulic power boost mechanism in a hydraulic brake system for an automotive vehicle, comprising:
   a brake pedal;
   a housing defining therein a housing bore having first and second sections and connected with a fluid source, said first section having a larger diameter than that of said second section;
   a power piston slidably disposed within said first section of said housing bore to define a pressure chamber, said power piston having a longitudinally extending bore formed therein;
   a control valve disposed within said piston bore and being movable along the longitudinal axis of said piston between an applied position and a released position; and
   actuation means mounted in said housing bore for causing movement of said control valve and controlling an amount of reaction force created by said power booster, said actuation means including an outer member slidably received in said housing bore, said outer member engaging said piston for being drawn along said housing bore by said piston in response to said piston moving from said first position toward said second position; and an inner member slidably received in said outer member, said inner member having a first end engaging said control valve and a second end portion operatively connected with a brake pedal, said second end portion having an extreme end, and said inner member having a substantially constant diameter along said second end portion between said first end and said second extreme end for free and independent movement along the longitudinal axis of said outer member.

* * * * *